US011136779B2

(12) United States Patent
Kim

(10) Patent No.: US 11,136,779 B2
(45) Date of Patent: Oct. 5, 2021

(54) SEISMIC ISOLATION DEVICE

(71) Applicants: Heung Yeol Kim, Gunpo-si (KR); Hyun Joo Kim, Gunpo-si (KR); Nicole Yoonjung Kim, Woodside, NY (US)

(72) Inventor: Heung Yeol Kim, Gunpo-si (KR)

(73) Assignees: Heung Yeol Kim, Gunpo-si (KR); Hyun Joo Kim, Gunpo-si (KR); Nicole Yoonjung Kim, Woodside, NY (US)

( * ) Notice: Subject to any disclaimer, the term of this patent is extended or adjusted under 35 U.S.C. 154(b) by 188 days.

(21) Appl. No.: 16/476,230

(22) PCT Filed: May 23, 2017

(86) PCT No.: PCT/KR2017/005347
§ 371 (c)(1),
(2) Date: Jul. 5, 2019

(87) PCT Pub. No.: WO2018/131757
PCT Pub. Date: Jul. 19, 2018

(65) Prior Publication Data
US 2021/0140188 A1    May 13, 2021

(30) Foreign Application Priority Data
Jan. 10, 2017   (KR) .................. 10-2017-0003553

(51) Int. Cl.
*E04H 9/02*     (2006.01)
*E04B 1/98*     (2006.01)

(52) U.S. Cl.
CPC ............. *E04H 9/023* (2013.01); *E04H 9/022* (2013.01); *E04B 1/98* (2013.01)

(58) Field of Classification Search
CPC ...... E04B 1/36; E04B 1/98; E04H 9/02; E04H 9/021; E04H 9/023; E04H 9/0215; F16F 15/02; F16F 15/021; F16F 15/0251; F16F 15/08; E02D 27/34; E02D 1/38
USPC ................................. 52/167.7, 167.5, 167.6
See application file for complete search history.

(56) References Cited

U.S. PATENT DOCUMENTS

| 2,014,643 A | * | 9/1935 | Bakker | ................... E04H 9/023 |
| | | | | 384/49 |
| 3,347,002 A | * | 10/1967 | Penkuhn | ................. E04H 9/021 |
| | | | | 52/167.4 |
| 3,425,652 A | * | 2/1969 | Leary | ...................... F16F 15/08 |
| | | | | 248/632 |

(Continued)

FOREIGN PATENT DOCUMENTS

| JP | H05-045283 U | 6/1993 |
| JP | H10-252312 A | 9/1998 |

(Continued)

*Primary Examiner* — Kyle J. Walraed-Sullivan
(74) *Attorney, Agent, or Firm* — Korus Patent, LLC; Seong Il Jeong

(57) ABSTRACT

The present invention relates to a seismic isolation device, including: a sliding platform (100) having a sliding surface (120) of a downwardly concave spherical shape formed on an upper surface thereof; and a sliding body (200) placed on the sliding surface (120) being capable of sliding on the sliding surface (120) by means of a sliding means, wherein the sliding body (200) slides on the sliding surface (120) in a situation where an earthquake occurs to effectively absorb vibrations applied to a structure, such that the structure can be safely protected.

16 Claims, 15 Drawing Sheets

(56) References Cited

U.S. PATENT DOCUMENTS

| | | | | |
|---|---|---|---|---|
| 4,496,130 A * | 1/1985 | Toyama | ............. | F16F 15/067 248/585 |
| 4,974,378 A * | 12/1990 | Shustov | ............. | E02D 27/34 248/638 |
| 5,071,261 A * | 12/1991 | Stuve | ............. | F16F 15/08 384/36 |
| 5,456,047 A * | 10/1995 | Dorka | ............. | E04H 9/021 248/568 |
| 5,466,068 A * | 11/1995 | Andra | ............. | E01D 19/048 384/36 |
| 5,564,237 A * | 10/1996 | Yoneda | ............. | E02D 27/34 52/167.4 |
| 5,816,559 A * | 10/1998 | Fujimoto | ............. | E04H 9/021 248/636 |
| 5,845,542 A * | 12/1998 | Hannah | ............. | E21B 17/07 74/570.2 |
| 5,979,127 A * | 11/1999 | Yoneda | ............. | E04H 9/021 52/167.5 |
| 6,021,992 A * | 2/2000 | Yen | ............. | E04H 9/021 248/560 |
| 6,036,422 A * | 3/2000 | Postma | ............. | F16B 5/0241 403/28 |
| 6,052,955 A * | 4/2000 | Haider | ............. | A47C 21/006 52/167.5 |
| 6,123,313 A * | 9/2000 | Otsuka | ............. | E04H 9/023 248/580 |
| 6,230,460 B1 * | 5/2001 | Huyett | ............. | E04F 15/225 248/560 |
| 6,321,492 B1 * | 11/2001 | Robinson | ............. | E02D 31/08 52/167.1 |
| 6,948,284 B2 * | 9/2005 | Chiang | ............. | E04H 9/023 52/167.1 |
| 7,290,375 B2 * | 11/2007 | Kemeny | ............. | E04H 9/0237 52/167.1 |
| 7,814,712 B2 * | 10/2010 | Tsai | ............. | E04H 9/023 52/167.4 |
| 7,922,413 B2 * | 4/2011 | Roth | ............. | B64C 1/066 403/122 |
| 7,971,692 B2 * | 7/2011 | Gebelin | ............. | E04H 9/023 188/378 |
| 9,175,468 B1 * | 11/2015 | Tsai | ............. | E01D 19/046 |
| 9,399,865 B2 * | 7/2016 | Hubbard | ............. | E04H 9/023 |
| 2003/0107162 A1 * | 6/2003 | Van Siyke | ............. | F16F 7/00 267/136 |
| 2003/0167707 A1 * | 9/2003 | Tsai | ............. | E01D 19/04 52/167.5 |
| 2005/0100253 A1 * | 5/2005 | Chang | ............. | H05K 7/1495 384/36 |
| 2006/0174555 A1 * | 8/2006 | Zayas | ............. | E04H 9/023 52/167.4 |
| 2007/0157532 A1 * | 7/2007 | Tsai | ............. | E04H 9/023 52/167.1 |
| 2008/0098671 A1 * | 5/2008 | Tsai | ............. | E04H 9/023 52/167.6 |
| 2011/0016805 A1 * | 1/2011 | Tsai | ............. | F16F 15/021 52/167.1 |
| 2012/0174500 A1 * | 7/2012 | Yakoub | ............. | E04B 1/98 52/167.4 |
| 2016/0340924 A1 * | 11/2016 | Kanzaki | ............. | E04H 9/023 |
| 2016/0348389 A1 * | 12/2016 | Connesson | ............. | E04H 9/023 |
| 2017/0108034 A1 * | 4/2017 | McGuire | ............. | F16C 11/0652 |
| 2018/0058086 A1 * | 3/2018 | Hubbard | ............. | E04B 1/98 |
| 2018/0128346 A1 * | 5/2018 | Wakeen | ............. | F16F 15/021 |
| 2018/0195267 A1 * | 7/2018 | Massa | ............. | E04H 9/021 |
| 2019/0338547 A1 * | 11/2019 | Almaz N Campillay | ............. | E02D 5/74 |
| 2020/0348223 A1 * | 11/2020 | De Jesus | ............. | E04B 1/98 |

FOREIGN PATENT DOCUMENTS

| | | | | |
|---|---|---|---|---|
| JP | | 3143399 U | 7/2008 | |
| WO | | WO-9748866 A1 * | 12/1997 | ............. F16F 15/02 |

* cited by examiner

SEISMIC ISOLATION DEVICE

TECHNICAL FIELD

The present invention relates to a seismic isolation device being capable of protecting a structure from an earthquake.

BACKGROUND ART

When an earthquake occurs, vibrations are transmitted longitudinally or transversely to a structure such as a building or facilities, etc. Transverse vibrations cause the structure to be heavily shaken and twisted. In case of transmission of heavy vibrations, damage to a part of the structure may occur, causing stability of the structure to be degraded. In serious cases, the structure may collapse.

In order to prevent the structure from being damaged due to an earthquake, a seismic isolation device is installed at the structure. Normally, the seismic isolation device maintains a state of supporting the structure. However, if an earthquake occurs, the seismic isolation device absorbs vibrations due to the earthquake, serving to protect the structure from the earthquake.

DOCUMENT OF PRIOR ART

Patent Document (Patent Document 1) Korean Patent No. 10-1684575 registered on Dec. 2, 2016 entitled "Seismic Isolation Device"

DISCLOSURE

Technical Problem

The present invention is aimed at obtaining a seismic isolation device being capable of effectively absorbing vibrations applied to a structure under the conditions that an earthquake has occurred, and thus being capable of securely protecting the structure from the earthquake.

Technical Solution

In order to accomplish the above object, the present invention provides a seismic isolation device, including a sliding platform having a sliding surface of a downwardly concave shape provided on an upper surface thereof, and a sliding body movably placed on the sliding surface, being capable of sliding on the sliding surface by means of a sliding means, wherein the sliding body slides on the sliding surface and absorbs vibrations due to an earthquake.

Advantageous Effects

According to the present invention, the vibrations applied to a structure under the conditions that an earthquake has occurred can be effectively absorbed, thereby resulting in protecting the structure securely upon occurrence of the earthquake.

MODE FOR INVENTION

In order to obtain a seismic isolation device being capable of effectively absorbing vibrations applied to a structure under the conditions that an earthquake has occurred, thereby being capable of securely protecting the structure from the earthquake, the present invention provides a seismic isolation device, including a sliding platform having a sliding surface of a downwardly concave shape provided on an upper surface thereof, and a sliding body movably placed on the sliding surface, being capable of sliding on the sliding surface by means of a sliding means, wherein the sliding body slides on the sliding surface and absorbs vibrations due to an earthquake.

Hereinafter, the present invention will be described in detail, with reference to the accompanying drawings, that is, from FIGS. 1 to 16.

Figure 1:
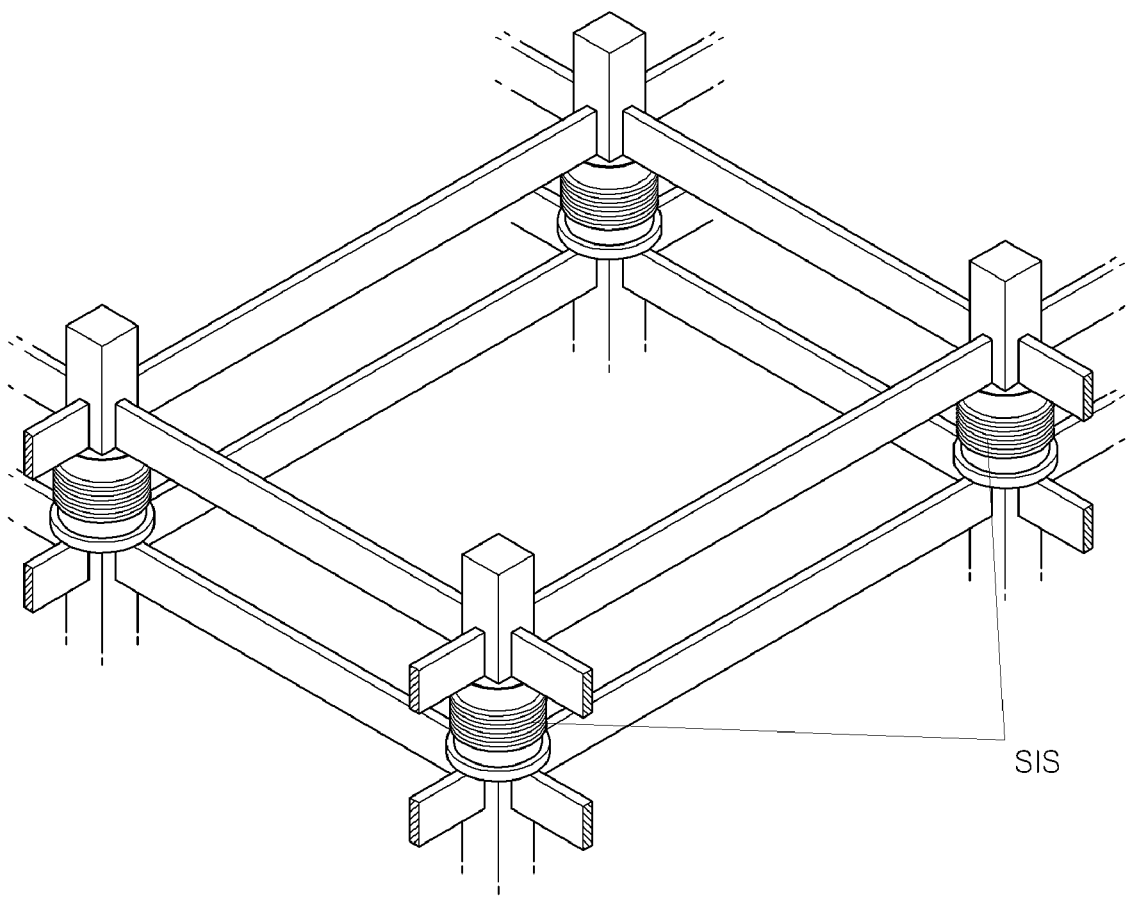
FIG. 1 is a view illustrating an installation state of a seismic isolation device according to the present invention.

FIG. 1 is a view illustrating an installation state of a seismic isolation device according to an exemplary embodiment of the present invention.

As shown therein, a seismic isolation device (SIS) according to the present invention is for horizontal-motion isolation of a structure from the ground and is installed on a point of the structure at which a vertical load can be withstood. The seismic isolation device is installed on a lower end portion of a pillar of the structure.

Figure 2:
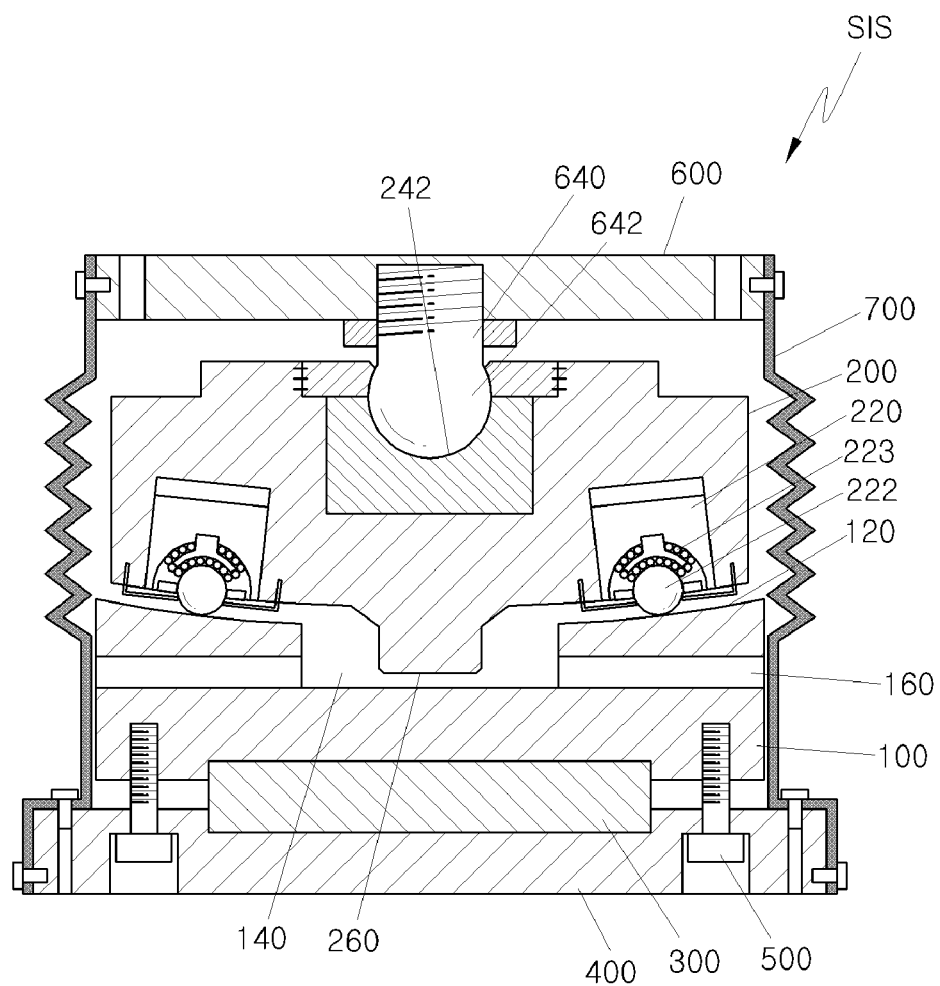
FIG. 2 is a view schematically illustrating a structure of a seismic isolation device according to an exemplary embodiment of the present invention.
Figure 3:
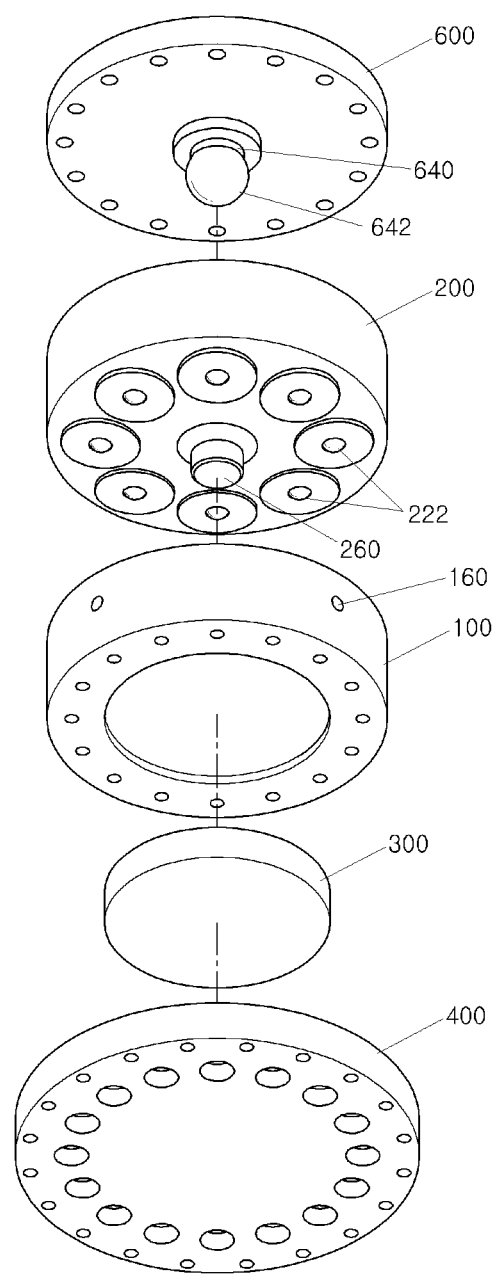
FIG. 3 is an exploded view illustrating main configurations of a seismic isolation device according to an exemplary embodiment of the present invention.
Figure 4:
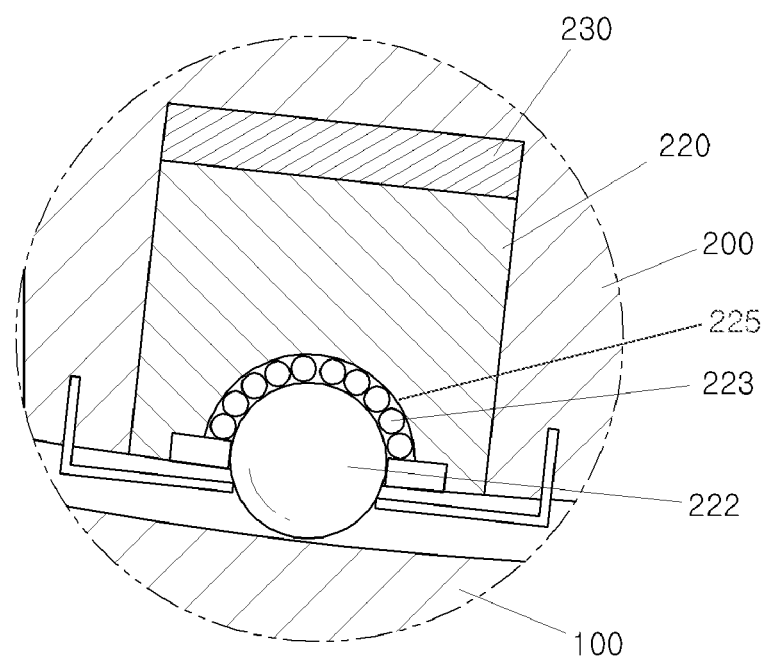
FIGS. 4 and 5 are views illustrating different embodiments of a structure to support a sliding ball according to the present invention.
Figure 5:
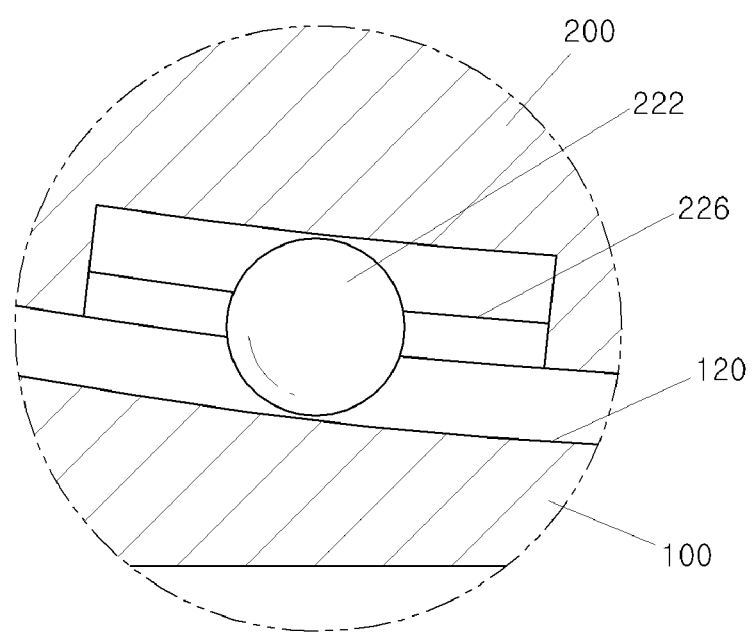
Figure 6:
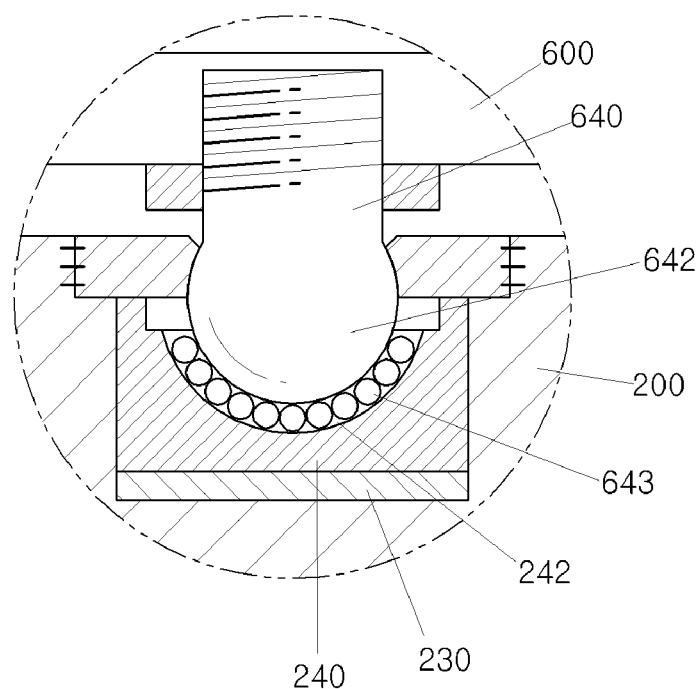
FIG. 6 is a view illustrating a different embodiment of a structure to support a pivot ball body according to the present invention.

FIG. 2 is a view schematically illustrating a structure of a seismic isolation device according to an exemplary embodiment of the present invention, FIG. 3 is an exploded view illustrating main configurations of a seismic isolation device according to an exemplary embodiment of the present invention, FIGS. 4 and 5 are views illustrating different embodiments of a structure to support a sliding ball according to the present invention, and FIG. 6 is a view illustrating a different embodiment of a structure to support a pivot ball body according to the present invention.

As shown in FIG. 2, the seismic isolation device (SIS) according to the present invention includes a sliding platform 100 and a sliding body 200 that slides on the slide platform 100 by means of a sliding means.

The sliding platform 100 has a predetermined thickness and includes a sliding surface 120 of a downwardly concave shape formed on an upper surface thereof. The body of the sliding platform 100 may be in a disc form, but not limited thereto.

The sliding body 200 has a predetermined thickness, having a bottom surface of a downwardly convex shape so as to correspond to the sliding surface 120. The sliding body 200 is placed on the sliding surface 120 to slide thereon. The bottom surface of the sliding body 200 may be in a convex shape. The sliding means may be provided in the bottom surface of the sliding body 200 or provided separately. As the sliding means is seated on the sliding surface 120, the sliding body 200 slides on the sliding surface 120 in all directions. Accordingly, even in a situation that the sliding platform 100 moves horizontally because of the vibrations due to the earthquake, the sliding body 200 does not move, thus resulting in reducing the degree of the vibrations transmitted to the structure.

A motion-limiting hole 140 is provided in the center of the sliding surface 120, and a motion-limiting protrusion 260 corresponding to the motion-limiting hole 140 is provided on the bottom surface of the sliding body 200. The motion-limiting protrusion 260 is configured to have a thickness thinner than a diameter of the motion-limiting hole 140, thereby enabling a certain degree of motion of the motion-limiting protrusion 260 within the motion-limiting hole 140. Accordingly, although horizontal vibrations occur, the motion-limiting protrusion 260 does not slip off from the motion-limiting hole 140, thereby preventing the sliding body 200 from slipping off from the sliding platform 100.

As described above, in such a structure where the motion-limiting hole 140 is formed, an inspection hole 160 extending from an outer circumference of the sliding platform 100 to the motion-limiting hole 140 is formed. Through the inspection hole 160, the inside of the motion-limiting hole 140 is observed, so as to inspect any damage to the motion-limiting protrusion 260 or presence of foreign matter therein, etc.

The sliding means may be formed as a plurality of sliding balls 222 provided on the bottom surface of the sliding body 200. For each ball transfer unit 220, a housing 225 is concavely formed on the bottom surface of the sliding body 200. Inside the housing 225, a sliding ball 222 is received, and each of the sliding balls 222 is embedded in such a manner that the sliding ball 222 is partially exposed externally, so as to be rotatably installed in the housing 225. The appropriate number of the sliding balls 222 is set so as to stably support the sliding body 200. Naturally, installation positions of the sliding balls 222 are appropriately chosen so that the sliding body 200 can slide while balancing weight.

Meanwhile, inside the housing 225 in which the sliding ball 222 is received, auxiliary balls 223 may be provided. In this case, an inner wall surface of the housing 225 is in a semi-spherical shape, and the auxiliary balls 223 are arranged along the inner wall surface of the housing 225, and the sliding ball 222 is so installed as to come into close contact with the auxiliary balls 223. The auxiliary balls 223 are disposed and rolled between an associated sliding ball 222 and the inner wall surface of the housing 225, thereby reducing friction.

Arrangement of the auxiliary balls 223 may be two layers (FIG. 2) or one layer (refer to FIG. 4). It is also possible to install the sliding balls 222 on a support plate 226, without the auxiliary balls 223, and then install the sliding balls 222 in the housing (FIG. 5).

Here, the sliding means may be formed as a ball transfer unit 220 embedded on the bottom surface of the sliding body 200. In this configuration, the ball transfer unit 220 is provided with a sliding ball 222 which is embedded on the bottom surface of the sliding body 200. At this time, the ball transfer unit 220 may be formed in such a manner that the rear thereof is supported by an elastic plate 230 (FIG. 4). The elastic plate 230 is made of a material having elasticity, such as rubber, serving to absorb vibrations and shocks.

The seismic isolation device (SIS) according to the present invention may further include an elastic spacer 300 installed under the sliding platform 100, to elastically support the sliding platform 100. The elastic spacer 300 may be made of a material having elasticity, for example, rubber or polyurethane. The elastic spacer 300 is configured to have predetermined area and thickness, thereby elastically absorbing vertical vibrations.

The elastic spacer 300 may be installed on the supporter 400. The supporter 400 takes a plate shape, on the upper surface of which the elastic spacer 300 is seated, thereby supporting the elastic spacer 300. A groove in which the elastic spacer 300 is seated may be formed on the upper surface of the supporter 400, limiting motion of the elastic spacer 300 so as not to slide. As the same form of this groove is also formed on the bottom surface of the sliding platform 100, the elastic spacer 300 can be held at the top and at the bottom.

The sliding platform 100 is coupled to the supporter 400 by bolts 500, with the elastic spacer disposed therebetween. The bolt 500 is arranged in plural at uniform intervals on a concentric circle, thereby being capable of coupling the sliding platform 100 to the elastic spacer 300. At this time, coupling by the bolt 500 is made in a vertically movable manner, thereby enabling the sliding platform 100 to be movable vertically according to contraction and expansion of the elastic spacer 300. The bolt 500 is also coupled toward the sliding platform 100 from the supporter 400. However, as the bolt 500 at the supporter 400 portion has no thread, it is possible to allow the coupled bolt 500 to be moved vertically.

The seismic isolation device (SIS) according to the present invention may further include a structure supporter 600 provided above the sliding body 200, to support the structure. The structure supporter 600 is configured to have a predetermined thickness and takes a plate shape, enabling the structure to be mounted on an upper surface thereof. A pivot 640 in a lower end of which a pivot ball body 642 of a spherical shape is formed protrudes downwardly and is held to the sliding body 200 by an axial coupling. The pivot 640 may be separately provided and then coupled to the bottom surface of the structure supporter 600.

A pivot ball cup 242 that accommodates the pivot ball body 642 therein is formed on the upper surface of the sliding body 200, so as to allow the pivot 640 to be coupled to the sliding body 200. The pivot ball cup 242 is a cup whose inner wall constitutes a sphere, corresponding in shape to the pivot ball body 642 provided in a spherical shape, whereby the pivot ball body 642 can be coupled rotatably in the pivot ball cup 242. According to this, the structure supporter 600 is provided above the sliding body 200 in a rotatable manner.

Here, auxiliary balls 643 may be provided inside the pivot ball cup 242 (FIG. 6). The auxiliary balls 643 are arranged along an inner wall surface of the pivot ball cup 242, and the pivot ball body 642 is installed to come into contact with the auxiliary balls 643. Accordingly, the auxiliary balls are arranged and rolled between the pivot ball body 642 and the inner wall surface of the pivot ball cup 242, thereby reducing friction.

Meanwhile, the pivot ball cup 242 is formed in an embedded bearing housing 240, and the embedded bearing housing 240 is embedded in the upper surface of the sliding body 200, thereby allowing the pivot ball cup 242 to be formed on the upper surface of the sliding body 200. According to this configuration, the embedded bearing housing 240 is configured so that the rear thereof is supported by the elastic plate 230 (FIG. 6). The elastic plate 230 is made of a material having elasticity such as rubber, serving to absorb vibrations and shocks.

The seismic isolation device (SIS) according to the present invention may further include a protective cover 700 that accommodates the sliding platform 100 and the sliding body 200 therein so as to protect them. Where the elastic spacer 300, the supporter 400, and the structure supporter 600 are provided, a lower end of the protective cover 700 is fixed to the supporter 400, and an upper end thereof is fixed to the structure supporter 600, thereby accommodating and protecting all of the above-described components. The protective cover 700 protects the components from dust, foreign matter, heat, flame, moisture, etc. By protecting the components from a variety of external pollution sources, the protective cover 700 enables the components to perform their functions properly in any environment and also maximize the service life thereof.

The protective cover 700 is flexibly formed. For this, a configuration wherein a part of the protective cover 700 is in a corrugated tube form so as to be flexible and extendible. The protective cover 700 that is flexible and extendible is naturally contracted or extended as described above when an earthquake occurs, thereby preventing absorption of the vibrations from being disturbed. Accordingly, the seismic isolation function is realized as it is designed.

The seismic isolation device (SIS) according to the present invention as described above enables the sliding body 200 to absorb horizontal vibrations, the elastic spacer 300 to absorb vertical vibrations, and the structure supporter 600 to absorb rotational vibrations. As the components are selectively or entirely provided in a single seismic isolation device (SIS), an optimal seismic isolation function is realized.

Based on the basic configurations as described above, various embodiments of the configurations constituting the seismic isolation device (SIS) according to the present invention will be explained below.

Figure 7:
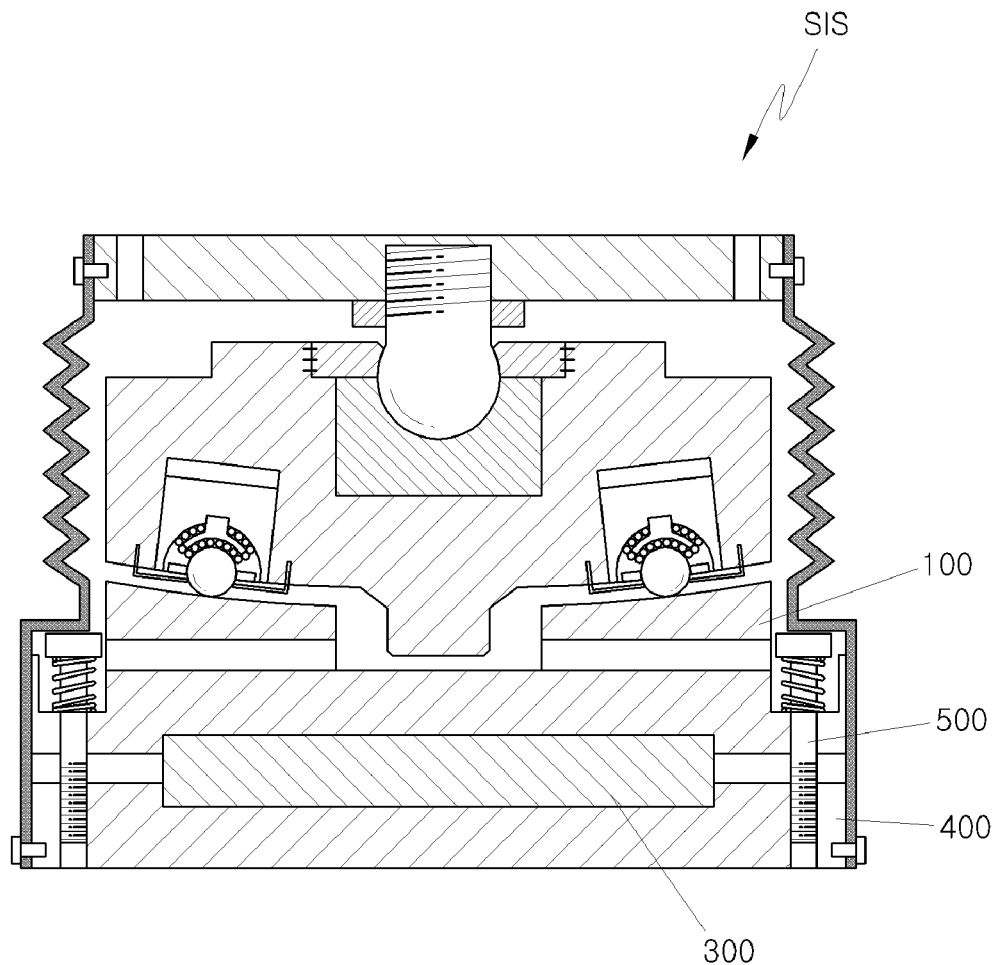
FIG. 7 is a view illustrating a different embodiment of a structure to couple a sliding platform to a supporter in a seismic isolation device according to the present invention.

FIG. 7 is a view illustrating a different embodiment of a structure to couple a sliding platform to a supporter in a seismic isolation device according to the present invention.

The seismic isolation device (SIS) according to the present invention can couple the sliding platform 100 to the supporter 400 by means of the bolts 500 that pass through the sliding platform 100 up to the supporter 400. At this time, as no thread is formed in the sliding body 100 portion, the coupled bolt 500 is allowed to be vertically movable. Accordingly, as the bolt 500 is coupled so as to be movable vertically, the sliding platform 100 can move vertically according to contraction and expansion of the elastic spacer 300. As a result, the elastic spacer can smoothly absorb vertical vibrations.

Meanwhile, a spring is coupled to the bolt 500, thereby increasing capacity for absorbing the vibrations due to contraction and expansion of the spring.

Figure 8:
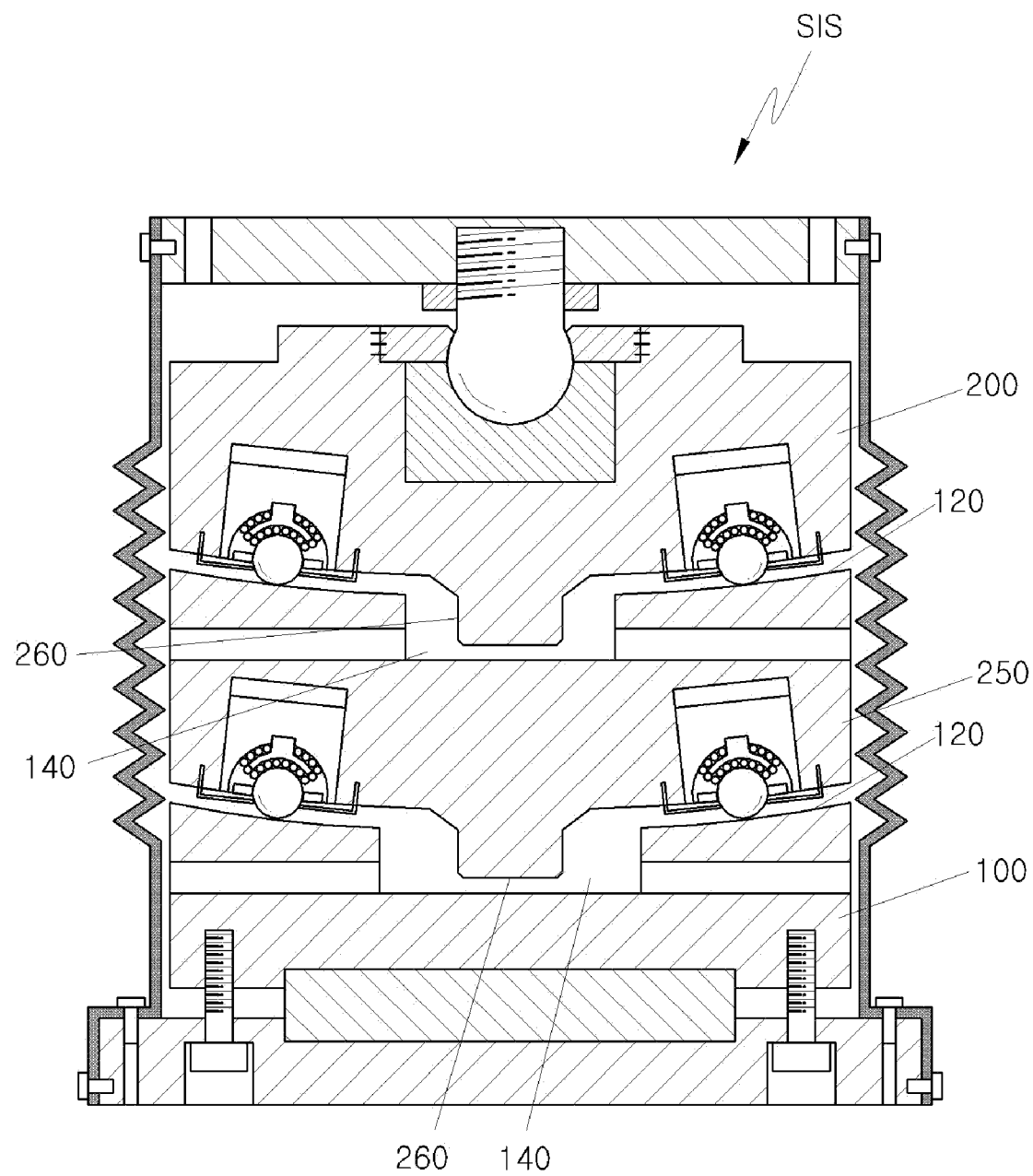
FIG. 8 is a view illustrating a seismic isolation device being provided with an auxiliary sliding body according to the present invention.

FIG. 8 is a view illustrating a seismic isolation device being provided with an auxiliary sliding body according to the present invention.

The seismic isolation device (SIS) according to the present invention is provided with an auxiliary sliding body 250, constituting a multiple sliding body structure together with the sliding body 200.

The auxiliary sliding body 250 has an upper surface in which a concave sliding surface 120 is formed, and is disposed between the sliding platform 100 and the sliding body 200. As the auxiliary sliding body 250 is provided and placed between the sliding body 200 and the sliding surface 120, the multiple sliding body structure is constructed. Where one auxiliary sliding body 250 is provided, the sliding body 200 is placed on the auxiliary sliding body 250. Where two or more auxiliary sliding bodies 250 are provided, the multiple sliding body structure is formed by stacking the auxiliary sliding bodies 250 one by one on top of each other and placing the sliding body 200 on the top auxiliary sliding body 250.

On the upper surface of the auxiliary sliding body 250 is formed a concave sliding surface 120, and a motion-limiting hole 140 is formed in the center of the sliding surface 120. A motion-limiting protrusion 260 formed in the sliding body 200 is received in the motion-limiting hole 140. The motion-limiting protrusion 260 formed on the bottom surface of the auxiliary sliding body 250 is received in the motion-limiting hole 140 formed in the sliding platform 100. Accordingly, the auxiliary sliding body 250 is prevented from slipping off from the sliding platform 100. Likewise, the sliding body 200 is prevented from slipping off from the auxiliary sliding body 250.

The auxiliary sliding body 250 is movably supported by the sliding means. As the sliding means was described above, further description thereof is omitted.

Figure 9:
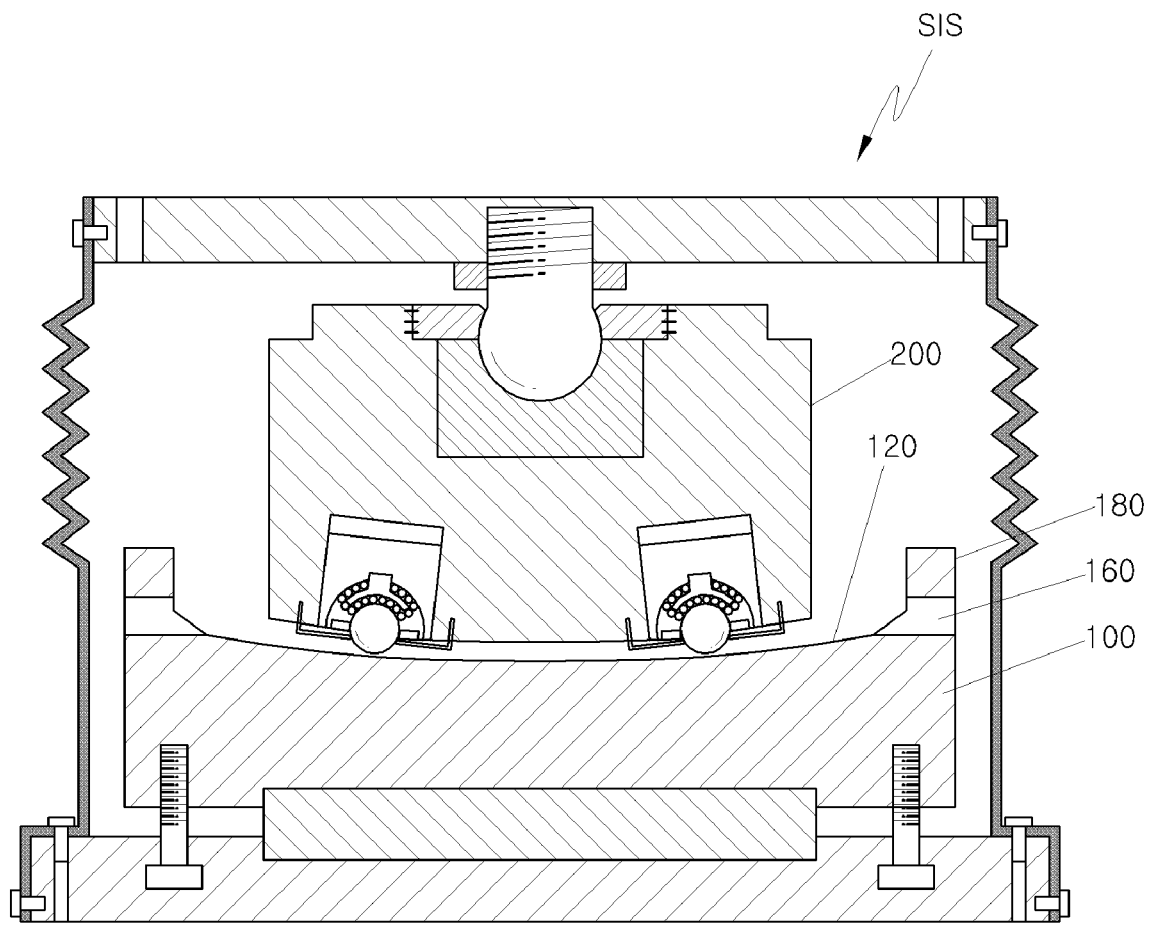
FIG. 9 is a view illustrating a seismic isolation device employing a sliding surface according to another exemplary embodiment of the present invention.
Figure 10:
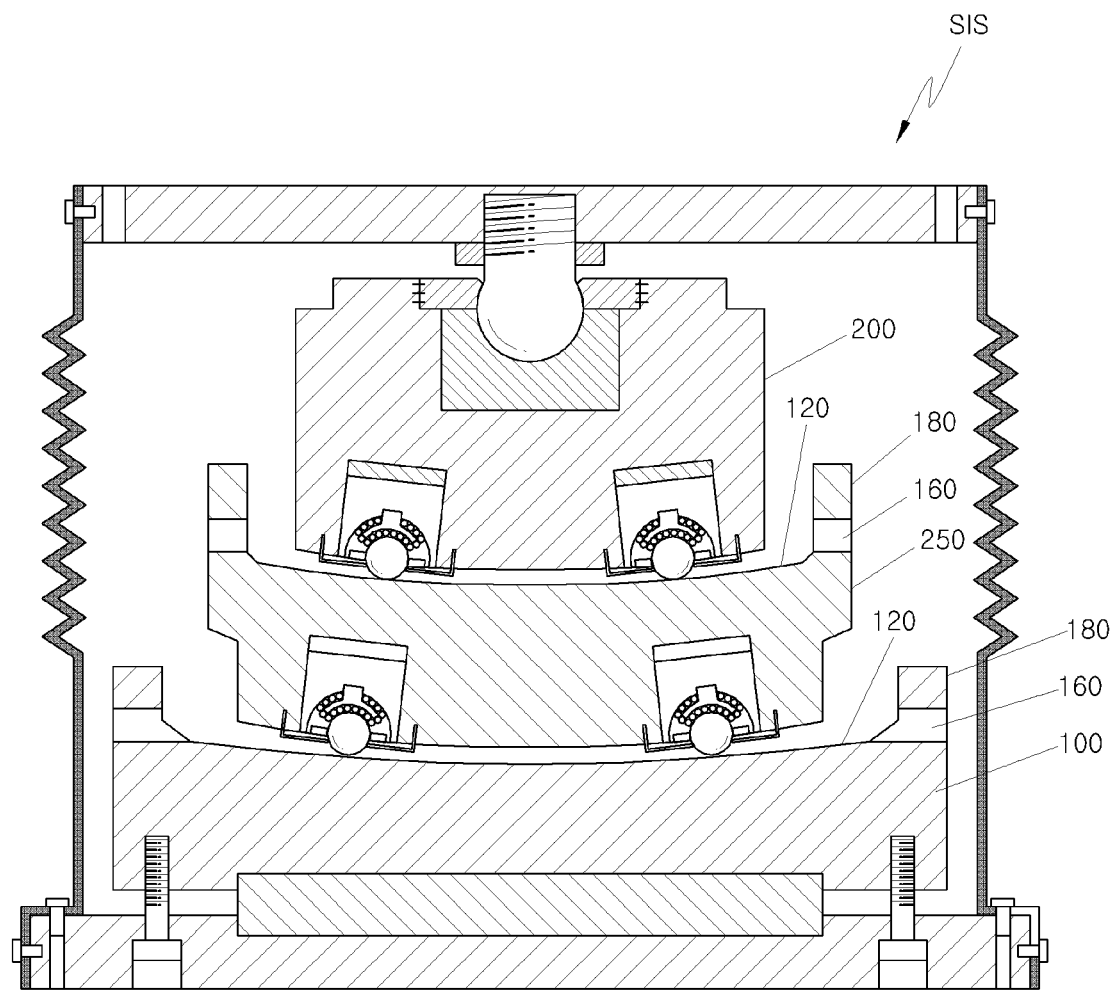
FIG. 10 is a view illustrating a structure in which an auxiliary sliding body is provided in the seismic isolation device of FIG. 9.

FIG. 9 is a view illustrating a seismic isolation device employing a sliding surface according to another exemplary embodiment of the present invention, and FIG. 10 is a view illustrating a structure in which an auxiliary sliding body is provided in the seismic isolation device of FIG. 9.

In the seismic isolation device (SIS) according to the present invention, it is possible to configure the sliding surface 120 in a different manner from the sliding surface 120 as described above. The sliding surface 120 as described above is formed in the upper surface of the sliding platform 100 and the auxiliary sliding body 250. According to another exemplary embodiment of the present invention, the sliding surface 120 is formed of a concaved shape, and a motion-limiting stopper 180 is formed on an edge of the sliding surface 120.

In this configuration, the sliding body 200 is placed on the sliding surface 120 in a state that the sliding body 200 is received inside the motion-limiting stopper 180. Where the auxiliary sliding body 250 in the upper surface of which the sliding surface 120 is formed is provided, the motion-limiting stopper 180 is also formed on an edge of the sliding surface 120 formed on the auxiliary sliding body 250. Accordingly, as shown in FIG. 10, the auxiliary sliding body 250 is placed on the sliding surface 120 formed on the sliding platform 100 in a state that the auxiliary sliding body 250 is received inside the motion-limiting stopper 180, and then the sliding body 200 is placed on the sliding surface 120 formed in the auxiliary sliding body 250 in a state that the sliding body 200 is received inside the motion-limiting stopper 180, thereby constituting a multiple sliding body structure.

According to the configuration as described above, where the sliding body 200 or the auxiliary sliding body 250 slides on the sliding surface 120 upon occurrence of vibrations, the sliding range thereof is limited by the motion-limiting stopper 180. As a result, the sliding body 200 or the auxiliary sliding body 250 is prevented from slipping off from the sliding surface 120.

In the meantime, an inspection hole 160 is formed in the motion-limiting stopper 180. The inside of the motion-limiting stopper can be inspected externally through the inspection hole 160.

Figure 11:
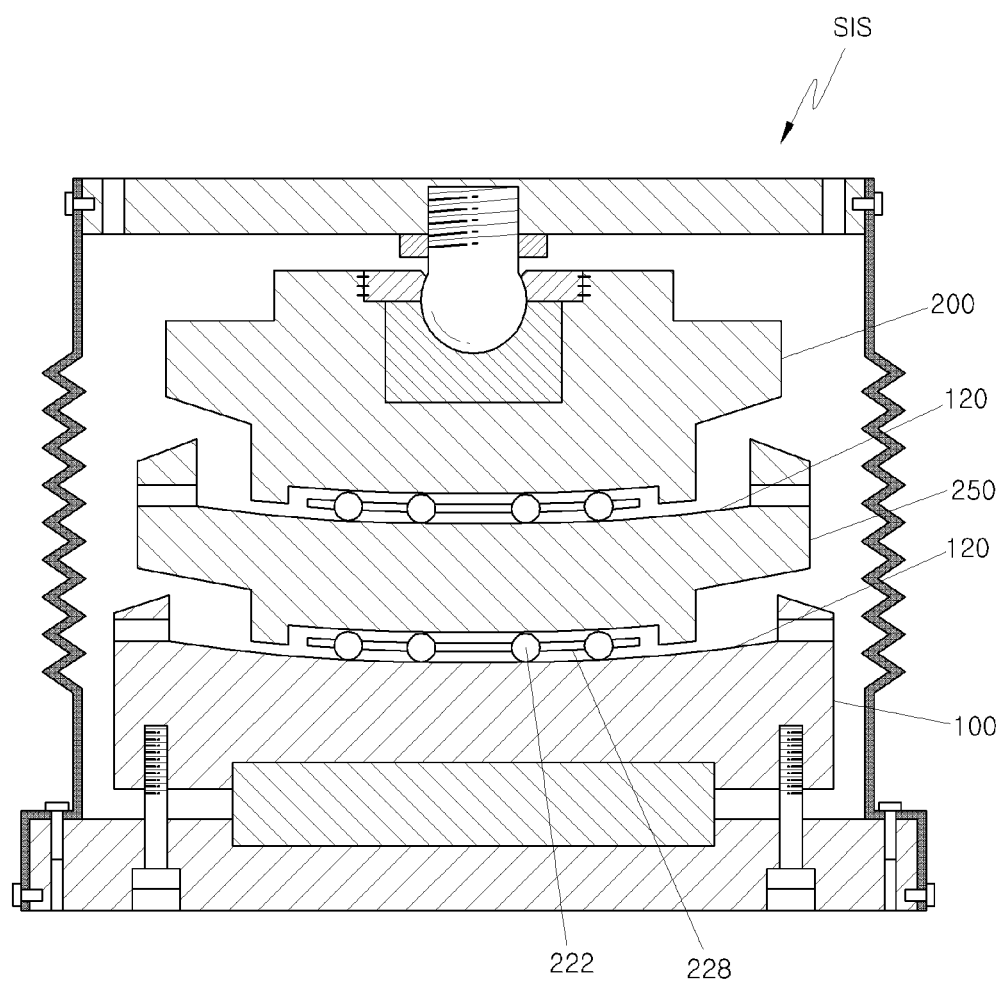
FIG. 11 is a view illustrating a seismic isolation device employing a sliding means according to another exemplary embodiment of the present invention.
Figure 12:
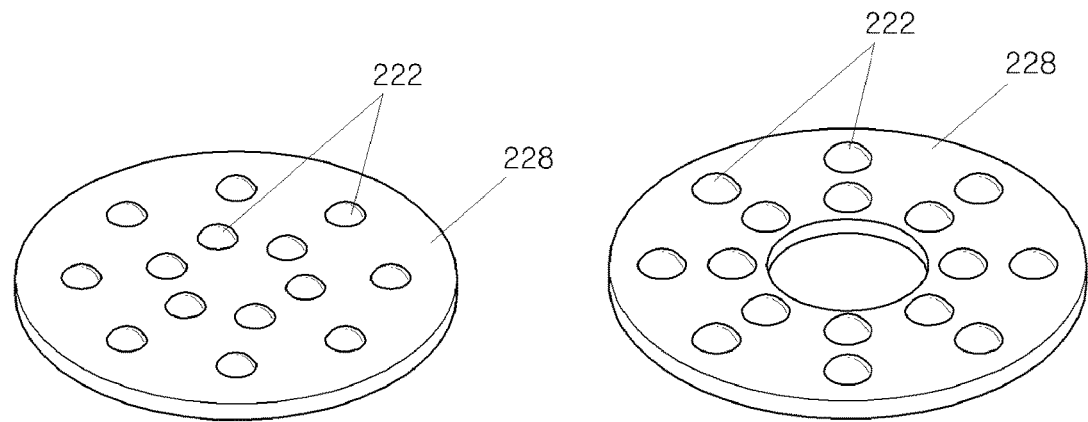
FIGS. 12 and 13 are views illustrating a sliding means according to further exemplary embodiments of the present invention.
Figure 13:
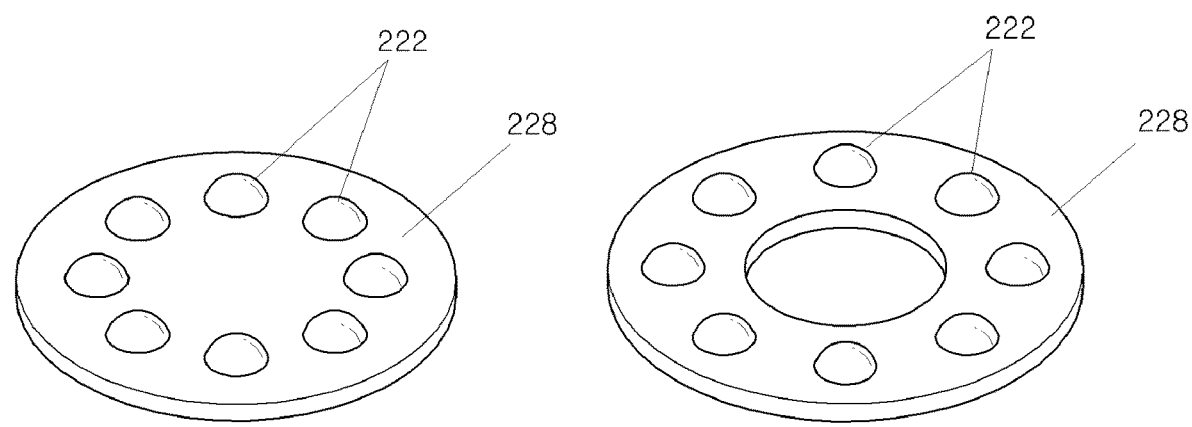

FIG. 11 is a view illustrating a seismic isolation device employing a sliding means according to another exemplary embodiment of the present invention, and FIGS. 12 and 13 are views illustrating a seismic isolation device employing a sliding means according to further exemplary embodiments of the present invention.

The sliding means applied to the present invention may be separately provided and then placed on the sliding surface 120. In this regard, a configuration wherein a plurality of sliding balls 222 is rotatably installed on a plate-shaped cage 228 is suggested, as shown in the drawings. The cage 228 may be formed to be convex downwardly so as to have a corresponding curvature to the sliding surface. As necessary, the central portion thereof may be perforated to constitute a ring shape.

The sliding balls are arranged concentrically at uniform intervals on the basis of the center of the cage 228. This arrangement is to balance weight. Also, the sliding balls 222 may be arranged in two or more layers in concentric circles having different diameters. As the number of sliding balls 222 increases, capacity for withstanding the weight also increases. Taking this into consideration, the number and the positions of the sliding balls are determined.

Configuration of the sliding means separately provided as described above may also be applied to a configuration wherein no auxiliary sliding body 250 is employed, in addition to the configuration wherein the auxiliary sliding body 250 is placed on the sliding platform 100 and the sliding body 200 is then placed on the auxiliary sliding body 250 (FIG. 11).

Figure 14:
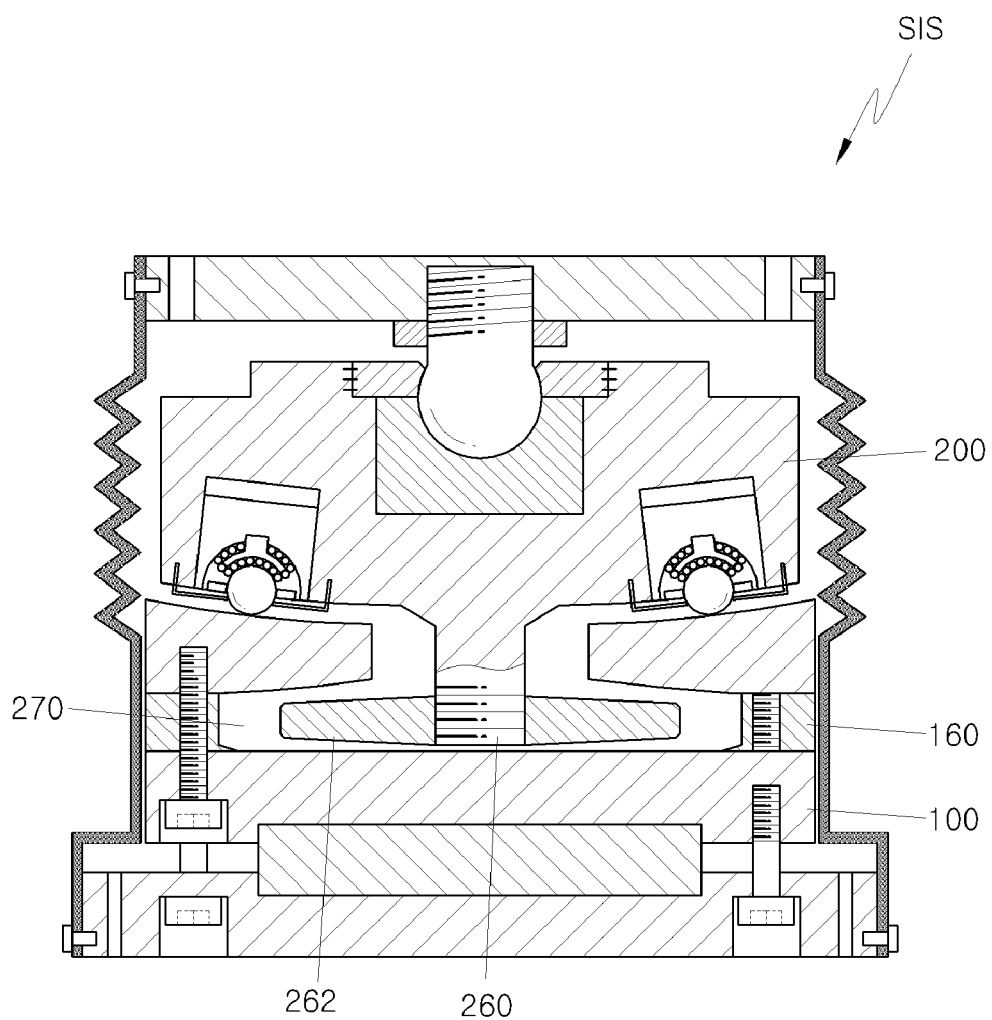
FIGS. 14 to 16 are views illustrating configurations wherein a collapse-preventing means is provided in the seismic isolation device according to the present invention.
Figure 15:
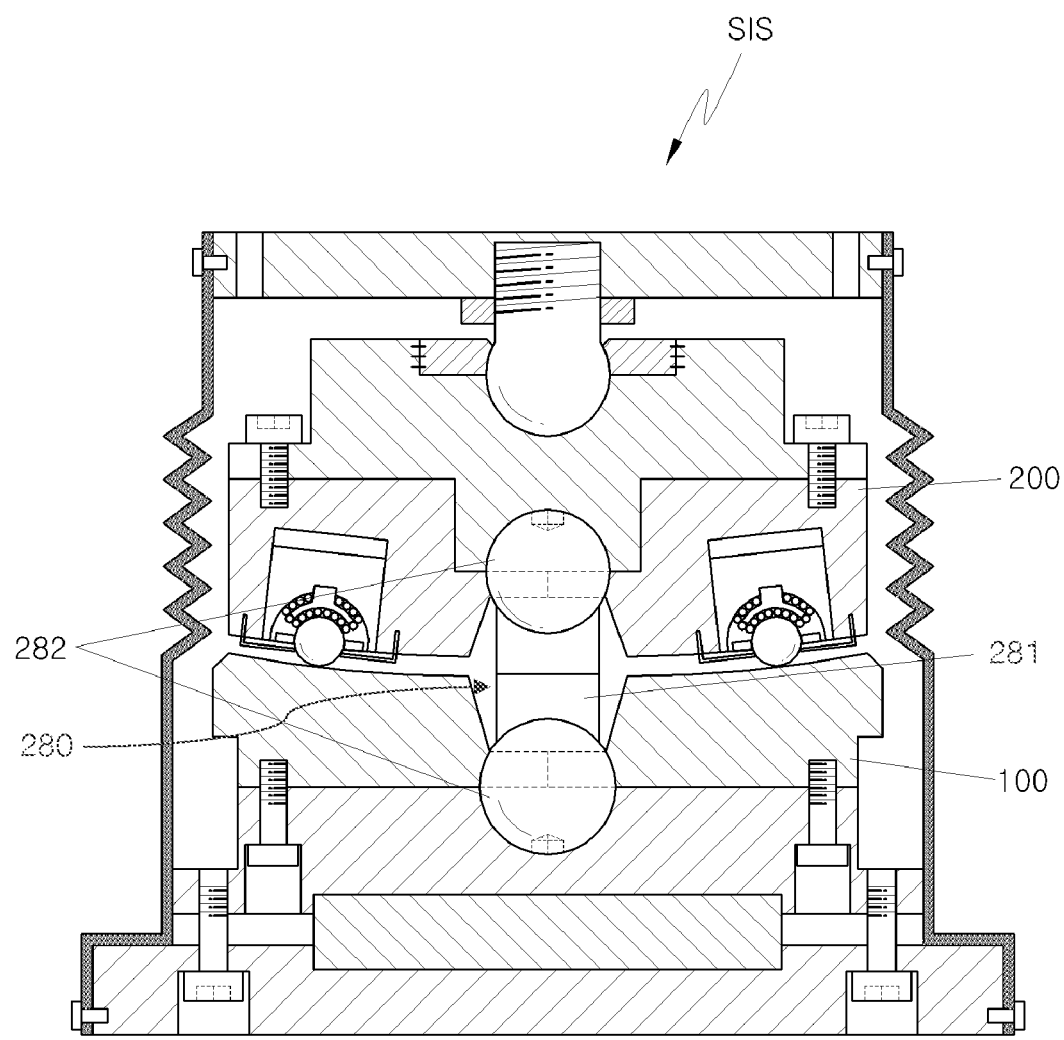
Figure 16:
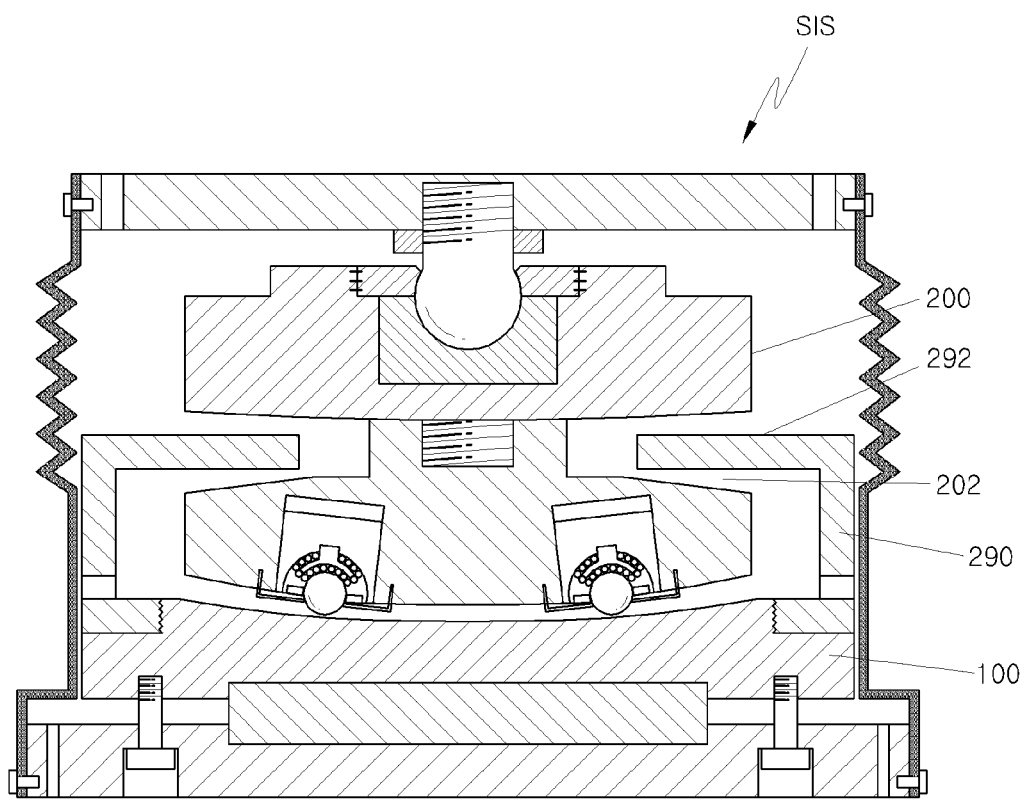

FIGS. 14 to 16 are views illustrating configurations wherein a collapse-preventing means is provided in the seismic isolation device according to the present invention.

The seismic isolation device (SIS) according to the present invention may be provided with a collapse-preventing means so as to prevent the sliding body 200 placed on the sliding platform 100 from being collapsed in the process of absorbing the vibrations. The collapse-preventing means may have various configurations according to configurations of the sliding platform 100 and the sliding body 200 according to the above-described embodiments.

That is, the collapse-preventing means may include a collapse-preventing plate 262 provided in a lower end of the motion-limiting protrusion 260, and a collapse-preventing plate chamber 270 provided in the motion-limiting hole 140, being configured to have a space allowable to allow the collapse-preventing plate 262 to move therein and a narrower inlet hole to receive the collapse-preventing plate 262 therein, preventing the collapse-preventing plate 262 from being slipped off therefrom (FIG. 14). In this configuration, the collapse-preventing plate chamber 270 is provided in the sliding platform 100. As the sliding platform 100 is assembled to be halved in a height direction on the basis of the collapse-preventing plate chamber 270, the collapse-preventing plate 262 can be received in the collapse-preventing plate chamber 270.

As a different example, the collapse-preventing means may include a ball joint 280 having a lower end thereof rotatably held to the sliding platform 100 and an upper end thereof rotatably held to the sliding body 200, between the sliding platform 100 and the sliding body 200 (FIG. 15). The ball joint 280 includes a joint body 281 having a predetermined length and joint balls 282 formed at the upper end and the lower end of the joint body 281 respectively. As the joint balls 282 are fitted to the holes formed in the sliding body 200 and the sliding platform 100 respectively, the joint balls 282 are rotatably held.

Here, the joint balls 282 may be detachably coupled to the joint body 281, and the joint body 281 may be separatedly formed. A hole to which an associated one of the joint balls 282 is fitted has a narrower inlet so as to prevent the joint ball 282 from falling out therefrom. For this purpose, the sliding body 200 may be configured to be halved into upper and lower parts on the basis of the holes. Likewise, the sliding body 100 may also be configured to be halved into upper and lower parts on the basis of the holes. In the upper end of the ball joint 280, the halved sliding body 200 is assembled to allow the joint ball 282 to be enclosed by an associated hole. Likewise, in the lower end of the ball joint 280, the halved sliding body 200 is assembled to allow the joint ball 282 to be enclosed by an associated hole. Accordingly, the joint balls 282 are received in the respective holes by assembling the halved sliding bodies 100 together.

As another example, the collapse-preventing means may be provided with a collapse-preventing ring 290 through which the sliding platform 100 and the sliding body 200 can be interconnected (FIG. 16). The collapse-preventing ring 290 may take a pipe shape having a predetermined height, having a lower end thereof thread-coupled to or coupled by a bolt to an outer circumference of the sliding platform 100 and an upper end thereof coupled to an outer circumference of the sliding body 200. In the upper end of the collapse-preventing ring 290, a locking protrusion 292 is formed inwardly. As a locking hole 202 is formed to a predetermined length along an outer circumference of the sliding body 200, the locking protrusion 292 is inserted into the locking hole 202 and engaged therewith. At this time, the locking hole 202 is configured to have a space available to allow the lower part of the sliding body 200 to be moved therein. Meanwhile, to allow the locking protrusion 292 to be inserted into the locking hole 202, the sliding body 200 may be arranged to be halved into upper and lower parts on the basis of the locking hole 202.

Due to the collapse-preventing means as described above, the sliding body 200 can slide on the slide platform 100 without being separated from the sliding platform 100, thereby preventing the sliding body 200 from being collapsed from the sliding platform 100 even in case of severe vibrations.

[Description of the symbols]

| | |
|---|---|
| 100: Sliding platform | 120: Sliding surface |
| 140: Motion-limiting hole | 160: Inspection hole |
| 180: Motion-limiting stopper | 200: Sliding body |
| 222: Sliding ball | 223, 643: Auxiliary ball |
| 230: Elastic plate | 240: Embedded bearing housing |

[Description of the symbols]

242: Pivot ball cup
260: Motion-limiting protrusion
300: Elastic spacer
500: Bolt
640: Pivot
700: Protective cove
400: Supporter
600: Structure supporter
642: Pivot ball body

The invention claimed is:

1. A seismic isolation device, comprising:
a sliding platform (100) having a sliding surface (120) of a downwardly concave shape provided on an upper surface thereof; and
a sliding body (200) placed on the sliding surface (120), having a bottom surface of a downwardly convex shape to correspond to the sliding surface (120), the sliding body being capable of sliding on the sliding surface (120) in all directions by means of a sliding means including a plurality of sliding balls (222),
wherein the sliding body (200) slides on the sliding surface (120) and absorbs vibrations due to an earthquake,
wherein a motion-limiting hole (140) is provided in the center of the sliding surface (120), and a motion-limiting protrusion (260) that corresponds to the motion-limiting hole (140) is provided on the bottom surface of the sliding body (200), whereby the motion-limiting protrusion (260) is prevented from deviating from the motion-limiting hole (140), thereby allowing the sliding body (200) to be maintained on the sliding platform (100) without being slipped off therefrom.

2. The seismic isolation device of claim 1, wherein a collapse-preventing plate (262) is provided on a lower end of the motion-limiting protrusion (260), and a collapse-preventing plate chamber (270) is provided in the motion-limiting hole (140), the collapse-preventing plate chamber (270) being configured to have a space receiving the collapse-preventing plate chamber (270) without being slipped off therefrom, thereby allowing the sliding body (200) to be maintained on the sliding platform (100) without being slipped off therefrom.

3. The seismic isolation device of claim 1, wherein an inspection hole (160) extending from an external surface of the sliding platform (100) to the motion-limiting hole (140) is provided, thereby enabling an inside of the motion-limiting hole (140) to be inspected externally.

4. The seismic isolation device of claim 1, wherein the sliding balls (222) are embedded in the bottom surface of the sliding body (200) in a state that each of the sliding balls (222) is partially exposed externally.

5. The seismic isolation device of claim 4, wherein the each of the sliding balls (222) is received in a housing (225) provided concavely on the bottom surface of the sliding body (200), and auxiliary balls (223) are provided inside the housing (225) and rolled in contact with an associated sliding ball (222), thereby reducing friction.

6. The seismic isolation device of claim 1, wherein the sliding means is a system consisting of multiple ball transfer units (220) each having one of the sliding balls (222) and is embedded in the bottom surface of the sliding body (200), and each of the ball transfer units (220) is supported by an elastic plate (230).

7. The seismic isolation device of claim 1, wherein the sliding means is installed on a plate-shaped cage (228), so as to allow the sliding balls (222) to be rotatably movable.

8. The seismic isolation device of claim 1, further comprising at least one auxiliary sliding body (250) disposed between the sliding platform (100) and the sliding body (200),
wherein the auxiliary sliding body (250) is supported by the sliding means and is capable of sliding on the sliding surface (120) that is concaved, having a concave sliding surface on the upper surface thereof, thereby allowing the sliding body (200) to be seated and slide thereon.

9. The seismic isolation device of claim 1, further comprising an elastic spacer (300) provided on the bottom of the sliding platform (100), to elastically support the sliding platform (100), thereby absorbing vibrations.

10. The seismic isolation device of claim 9, further comprising a supporter (400) that supports the elastic spacer (300),
wherein the sliding platform (100) is coupled by bolts (500) to the supporter (400), placing the elastic spacer (300) between the sliding platform (100) and the supporter (400), and the bolts (500) are vertically movable, causing the sliding platform (100) to be movable vertically according to contraction and expansion of the elastic spacer (300).

11. The seismic isolation device of claim 1, further comprising a structure supporter (600) provided above the sliding body (200), to support a structure,
wherein on the structure supporter (600), a pivot (640) having a pivot ball body (642) of a spherical shape on a lower end thereof is protruded downwardly, and a pivot ball cup (242) that receives the pivot ball body (642) therein is provided in the upper surface of the sliding body (200), and
the structure supporter (600) is rotatably movable in the sliding body (200) as the pivot ball body (642) is received in the pivot ball cup (242).

12. The seismic isolation device of claim 11, wherein an-auxiliary balls (643) are provided inside the axial hole pivot ball cup (242) and rolled in contact with the pivot ball body (642) sliding ball (222), thereby reducing friction.

13. The seismic isolation device of claim 11, wherein the pivot ball cup (242) is provided in an embedded bearing housing (240) which is embedded on the upper surface of the sliding body (200), causing the pivot ball cup (242) to be formed on the upper surface of the sliding body (200), and the embedded bearing (240) is supported by the elastic plate (230).

14. The seismic isolation device of claim 1, further comprising a protective cover (700) inside of which the sliding platform (100) and the sliding body (200) are received, to protect the sliding platform (100) and the sliding body (200),
wherein the protective cover (700) is configured to be flexible and extendible so as to absorb vibrations.

15. A seismic isolation device, comprising:
a sliding platform (100) having a sliding surface (120) of a downwardly concave shape provided on an upper surface thereof, and
a sliding body (200) placed on the sliding surface (120), having a bottom surface of a downwardly convex shape to correspond to the sliding surface (120), the sliding body being capable of sliding on the sliding surface (120) in all directions by means of a sliding means including a plurality of sliding balls (222),
wherein the sliding body (200) slides on the sliding surface (120) and absorbs vibrations due to an earthquake, further comprising a ball joint (280) having a lower end thereof rotatably held to the sliding platform (100) and an upper end thereof rotatably held to the sliding body (200), between the sliding platform (100) and the sliding body (200), wherein the ball joint (280) comprises a joint body (281) having a predetermined length and joint balls (282) formed at an upper end and a lower end of the joint body (281), respectively, and the joint balls (282) are fitted to holes formed in the sliding body (200) and the sliding platform (100), respectively, thereby preventing the sliding body (200) from slipping off from the sliding platform (100).

16. A seismic isolation device, comprising:

a sliding platform (100) having a sliding surface (120) of a downwardly concave shape provided on an upper surface thereof, and a sliding body (200) placed on the sliding surface (120), having a bottom surface of a downwardly convex shape to correspond to the sliding surface (120), the sliding body being capable of sliding on the sliding surface (120) in all directions by means of a sliding means including a plurality of sliding balls (222), wherein the sliding body (200) slides on the sliding surface (120) and absorbs vibrations due to an earthquake, wherein a collapse-preventing ring (290) having a lower end thereof held to an outer circumference of the sliding platform (100) and an upper end thereof held to an outer circumference of the sliding body (200) is provided, a locking hole (202) is provided to a predetermined depth along an outer circumference of the sliding body (200), and a locking protrusion (292) protruded toward the locking hole (202) is provided on an upper end of the collapse-preventing ring (290), wherein the locking protrusion (292) is engaged with the locking hole (202), thereby allowing the sliding body (200) to be movable and preventing the sliding body (200) from slipping off from the sliding platform (100).

* * * * *